United States Patent
Dangel et al.

(10) Patent No.: US 12,497,080 B2
(45) Date of Patent: Dec. 16, 2025

(54) METHOD AND SYSTEM FOR CONTROLLING AUTONOMOUS OR SEMI-AUTONOMOUS VEHICLE

(71) Applicant: EMBOTECH AG, Zürich (CH)

(72) Inventors: Manuel Dangel, Zürich (CH); Markus Stephan Hug, Zürich (CH); Stefano Longo, Zürich (CH); Alexander Domahidi, Zürich (CH)

(73) Assignee: EMBOTECH AG, Zürich (CH)

( * ) Notice: Subject to any disclaimer, the term of this patent is extended or adjusted under 35 U.S.C. 154(b) by 318 days.

(21) Appl. No.: 18/552,357

(22) PCT Filed: Mar. 26, 2021

(86) PCT No.: PCT/EP2021/058017
§ 371 (c)(1),
(2) Date: Sep. 25, 2023

(87) PCT Pub. No.: WO2022/199855
PCT Pub. Date: Sep. 29, 2022

(65) Prior Publication Data
US 2024/0300541 A1     Sep. 12, 2024

(51) Int. Cl.
*B60W 60/00* (2020.01)
*B60W 50/00* (2006.01)

(52) U.S. Cl.
CPC .... *B60W 60/0027* (2020.02); *B60W 50/0097* (2013.01); *B60W 2050/0031* (2013.01); *B60W 2520/10* (2013.01)

(58) Field of Classification Search
None
See application file for complete search history.

(56) References Cited

U.S. PATENT DOCUMENTS

| 9,567,915 | B2 | 2/2017 | Hattar et al. |
| 9,645,577 | B1 | 5/2017 | Frazzoli et al. |

(Continued)

FOREIGN PATENT DOCUMENTS

| CN | 109375632 A | 2/2019 |
| CN | 109491377 A | 3/2019 |

(Continued)

OTHER PUBLICATIONS

Anonymous: "resampling—What is an algorithm to re-sample from a variable rate to a fixed rate?—Signal Processing Stack Exchange", Apr. 8, 2013, 9 pages.(https://dsp.stackexchange.com/questions/8488/what-is-an-algorithm-to-re-sample-from-a-variable-rate-to-a-fixed-rate).

(Continued)

*Primary Examiner* — Daniel L Greene
*Assistant Examiner* — Robert L Pinkerton
(74) *Attorney, Agent, or Firm* — Mannava & Kang, P.C.

(57) ABSTRACT

The present invention is directed to computer-implemented method for controlling an autonomous or semi-autonomous vehicle. A vehicle model is provided and information describing a roadway (301) is obtained. This information is transformed in a Frenet-Serret frame, which defines a curvilinear coordinate space. Then, in the curvilinear coordinate space, a plurality of line segments (306, 307) are defined (3) along the roadway (301), at locations spaced longitudinally along a reference line defining the Frenet-Serret frame. The line segments have respective lengths that extends, each, perpendicularly to the reference line. Next, based on the defined line segments, a space-time corridor (327, 327", 326") is determined (5) to obtain a time-dependent space available for the vehicle. Bounds for the vehicle within said time-dependent space are subsequently obtained (6). The bounds define a set of constraints that delimit a plurality of (Continued)

convex space-time objects along the reference line. Said objects approximate the time-dependent space. Then, based on the obtained set of constraints and the provided vehicle model, the method provides (7) a motion trajectory of the vehicle through the plurality of convex space-time objects. This motion trajectory is optimized using a nonlinear programming solver. Finally, the motion trajectory is transformed (8) from the curvilinear coordinate space to a Euclidean coordinate space, to control the vehicle based on the transformed motion trajectory. The present invention further concerns related systems and computer program products.

15 Claims, 7 Drawing Sheets

(56) References Cited

U.S. PATENT DOCUMENTS

| | | | |
|---|---|---|---|
| 11,544,423 B2* | 1/2023 | Chen | G06F 30/20 |
| 11,628,859 B1* | 4/2023 | Zhou | B60W 40/06 |
| | | | 701/301 |
| 2005/0043874 A1 | 2/2005 | Chen et al. | |
| 2015/0009130 A1* | 1/2015 | Motta | G06F 3/0346 |
| | | | 345/156 |
| 2015/0345959 A1 | 12/2015 | Meuleau | |
| 2015/0346723 A1 | 12/2015 | Pedersen | |
| 2015/0353082 A1 | 12/2015 | Lee | |
| 2019/0204105 A1* | 7/2019 | Milstein | G01C 21/3407 |
| 2021/0086780 A1* | 3/2021 | Zhang | G05D 1/0088 |
| 2023/0211802 A1* | 7/2023 | Zhang | B60W 60/001 |
| | | | 701/27 |

FOREIGN PATENT DOCUMENTS

| | | |
|---|---|---|
| CN | 111830979 A | 10/2020 |
| CN | 112068545 A | 12/2020 |

OTHER PUBLICATIONS

International Search Report and Written Opinion for Application No. PCT/EP2021/058017, mailed date Sep. 7, 2021, 17 pages.

Meng Yu et al., "A Decoupled Trajectory Planning Framework Based on the Integration of Lattice Searching and Convex Optimization", IEEE Access, vol. 7, Sep. 24, 2019, pp. 130530-130551.

Liniger, et al., "Optimization-based autonomous racing of 1:43 scale RC cars", published in Special Issue: Predictive Control for Embedded Systems; in Optimal Control, vol. 36, Issue 5, Nov. 20, 2017, 20 pages.

* cited by examiner

METHOD AND SYSTEM FOR CONTROLLING AUTONOMOUS OR SEMI-AUTONOMOUS VEHICLE

CLAIM FOR PRIORITY

The present application is a national stage filing under 35 U.S.C 371 of PCT application number PCT/EP2021/058017, having an international filing date of Mar. 26, 2021, the disclosure of which is hereby incorporated by reference in its entirety.

TECHNICAL FIELD

The present invention relates to methods, systems, and computer program products for controlling autonomous or semi-autonomous vehicles based on computed motion trajectories.

PRIOR ART

U.S. Pat. No. 9,567,915 B1 discloses a system and method for controlling autonomous or semi-autonomous vehicle using a model of the motion of the vehicle that includes an uncertainty. The method samples a control space of possible control inputs to the model of the motion of the vehicle to produce a set of sampled control inputs and determines a probability of each sampled control input to move the vehicle into a state satisfying constraints on the motion of the vehicle.

U.S. Pat. No. 9,645,577 B1 generates a finite set of candidate trajectories of a vehicle that begin at a location of the vehicle as of a given time. The candidate trajectories are based on a state of the vehicle and on possible behaviors of the vehicle and the environment as of the location of the vehicle and the given time. A putative optimal trajectory is selected among the candidate trajectories based on costs associated with the candidate trajectories. The costs include costs associated with violations of rules of operation of the vehicle. The selected putative optimal trajectory is used to facilitate the operation related to control of the vehicle.

US 2015/346723 A1 discloses a method for controlling an autonomous vehicle by: obtaining information describing a current state of the autonomous vehicle and a goal state of the autonomous vehicle; determining an initial vehicle trajectory from the current state of the autonomous vehicle to the goal state of the autonomous vehicle; and determining an optimized vehicle trajectory based on the initial trajectory and a velocity profile, by applying numerical minimization to minimize a trajectory length value and a lateral acceleration value.

US 2015/353082 A1 provides a method for automated lane centering and/or lane changing purposes for a vehicle traveling on a roadway that employs roadway points from a map database to determine a reference vehicle path and sensors on the vehicle for detecting static and moving objects to adjust the reference path. The method includes reducing the curvature of the reference path to generate a reduced curvature reference path that reduces the turning requirements of the vehicle and setting the speed of the vehicle from posted roadway speeds from the map database. The method also provides multiple candidate vehicle paths and vehicle speeds to avoid the static and moving objects in front of the vehicle.

US 2015/345959 A1 discloses a method for controlling an autonomous vehicle by: obtaining information describing a roadway; defining a plurality of layers along the roadway between a starting position and a goal position, each layer having a first width, and each layer having a plurality of nodes that are spaced from one another transversely with respect to the roadway within the first width; and determining a first trajectory from the starting position to the goal position, by minimizing a cost value associated with traversing the layers.

The article "Optimization-based autonomous racing of 1:43 scale RC cars" by Liniger, Domahidi and Morari, published in Special Issue: Predictive Control for Embedded Systems; in Optimal Control, Volume 36, Issue 5, September/October 2015, relies on a model of a predictive contour control to solve the problem of autonomous racing and obstacle avoidance. A grid is generated using previous trajectories. Only lower and upper bounds are used to define constraints, which makes it possible to optimize for the shortest path.

SUMMARY OF THE INVENTION

A first aspect of the present invention concerns a computer-implemented method for controlling an autonomous or semi-autonomous vehicle. The method first comprises providing a vehicle model, which may, in fact, be a global model including several vehicle models. Information is then obtained, which describes a roadway. Next, the information obtained is transformed in a Frenet-Serret frame, which defines a curvilinear coordinate space.

At this point, a series of steps are performed in the curvilinear coordinate space. First, a plurality of line segments are defined along the roadway, at locations that are spaced longitudinally along a reference line defining the Frenet-Serret frame. The line segments are typically arranged between the starting position and a point that defines potential progress of the vehicle along the roadway. The line segments have respective lengths extending, each, perpendicularly to the reference line.

Next, based on the defined line segments, a space-time corridor is determined, in order to obtain a time-dependent space available for the vehicle. The space-time corridor can typically be represented as a drivable space (i.e., a surface) that is available for the vehicle along the roadway, at each time point. In that respect, this space-time corridor is preferably obtained from a time-dependent drivable space, as in embodiments discussed below. Interestingly, this space-time corridor makes it possible to obtain a time-dependent space that is available for the vehicle. Note, the "available space" and the "drivable space" refer to similar concepts. However, in the present document, the terminology "time-dependent drivable space" typically refers to data as used as input to determine the space-time corridor, while the terminology "time-dependent available space" (or "time-dependent space that is available to the vehicle", or the like) is typically used to described data obtained from the space-time corridor. As a result, the "available space" typically is a subset of the "drivable space". Plus, the time-dependent drivable space is typically represented as an area (i.e., a 2D quantity) evolving over time, while the time-dependent, available space can typically be regarded as a lateral space (i.e., a width, which is a 1D quantity) that is available for the vehicle at each time point and computed for each longitudinal point along the roadway. Yet, both concepts relate to a 2D space evolving over time.

Bounds are subsequently obtained for the vehicle. Such bounds are defined within the time-dependent space that was determined to be available for the vehicle at each time point. Such bounds include spatial bounds and, preferably, temporal bounds too. Importantly, such bounds make it possible to define a set of constraints that delimit a plurality of convex space-time objects, where such objects approximate, as a whole, the time-dependent space that was determined to be available for the vehicle. The convex objects are defined along the reference line, e.g., at the same locations (grid points) where the line segments are defined along the roadway. This, however, is not strictly needed; the convex objects may also be defined at other locations or based on a subset of such locations, for example.

Note, the concept of space-time refers to a multidimensional space that fuses one or more spatial dimensions and the dimension of time into a n-dimensional manifold, where n≥2. This means that in a space-time subtended by a first axis (e.g., t-axis) representing time and a second axis (e.g., y-axis) representing the available width (the lateral space that is available for the vehicle at a given time and at a given location along the reference line), the available space-time may for example be approximated by a polygon, e.g., a triangle, a rectangle, or any suitable convex shape. Such a 2D convex object can for instance be produced for each longitudinal grid point, i.e., at the same locations where the line segments are defined, as noted above. This gives rise to multiple 2D convex objects, which together capture the 2D space available for the vehicle as this space evolves over time. The sets of convex objects can be regarded as a 3D quantity (which includes a plurality of 2D convex objects), i.e., a quantity defined in a space-time subtended by time and the two spatial dimensions. Relying on convex space-time objects benefits to the subsequent optimization, for reasons discussed below.

Namely, the method subsequently provides a motion trajectory of the vehicle through the convex space-time objects (as delimited by the set of constraints), i.e., through the space-time spanned by such objects. The motion trajectory is computed based on the obtained set of constraints and the provided vehicle model. To that aim, a nonlinear programming solver is used to optimize the motion trajectory through the convex space-time objects. The latter provides a large solution space as input, which, in principle, improves the chance to obtain a meaningful, global optimal solution. Plus, relying on convex space-time objects prevent abrupt changes in the available space for the vehicle. So, not only the convex space-time objects ease the computations but, in addition, they also result in safer trajectories.

At this point, the method can revert to the Euclidean space. That is, the motion trajectory can be transformed from the curvilinear coordinate space to a Euclidean coordinate space. This, eventually, makes it possible to control the vehicle based on the transformed motion trajectory.

The present approach has multiple advantages. To start with, corridors are relied on in the first part of the optimization, instead of paths. This increases the space of potential solutions for the subsequent nonlinear programming (NLP) solver, as noted above. A corridor captures more information at a smaller cost, given that an infinity of paths can potentially pass through it. Plus, paths have no time information attached to them, which requires integrating time on top of paths and creating speed profiles along the paths. In the present case, this is not needed as temporal aspects are already included in the corridors, which makes it possible to save one step. Speed can subsequently be optimized as part of trajectories computed through the space-time corridor. Moreover, the convexification step favorably impacts the subsequent NLP optimization as it prevents abrupt changes in the available space for the vehicle, as noted earlier too.

Also, the convex shapes increase the chances that the NLP optimization will result in a globally optimal solution.

In embodiments, the most suitable space-time corridor is determined based on a time-dependent drivable space along the roadway. This drivable space is determined based on the defined line segments. That is, the method further comprises, prior to determining the space-time corridor, determining a time-dependent drivable space (along the roadway) as a space that is feasible, a priori, by the vehicle. This time-dependent drivable space serves as input to compute the space-time corridor. Namely, the space-time corridor is determined according to one or more constraints for the vehicle, such that, at each time point, a spatial part of the space-time corridor is contained in a corresponding spatial part of the time-dependent drivable space considered as input. In addition, the space-time corridor may be determined by taking obstacles into account, as in embodiments described below.

As discussed above, the time-dependent drivable space used as input can typically be regarded as a 2D shape along the roadway, where this 2D shape evolves over time. I.e., at each time point, a 2D space is potentially available for the vehicle to drive through. However, the space-time corridor will typically span, at each time point, a space that is a subset of this input 2D shape, owing to the applied constraints. More precisely, the space-time corridor gives rise, at each time point, to a spatial corridor that is contained in the corresponding 2D shape of the time-dependent drivable space for that same time point. In turn, the space-time corridor allows a time-dependent, available space to be determined for the vehicle (e.g., a time-dependent width), based on which a convex space-time object is obtained. Such a convex space-time object can be obtained at multiple locations along the reference line (e.g., at each grid point), which eventually allows an optimal trajectory to be efficiently computed. Determining the space-time corridor based on a time-dependent drivable space as described above makes it possible to pre-select some sensible space-time for the vehicle to drive through (and thus exclude non-sensible space-time), at little computational cost. The NLP solver is still needed to optimize the vehicle trajectory, albeit in a restricted space-time corridor. Only a simple optimization is required to determine the space-time corridor, as opposed to the more complex optimization performed by the NLP solver in order to provide the motion trajectory in the curvilinear space.

The vehicle model provided is preferably a global vehicle model that comprises two vehicle models. The global vehicle model may additionally include model parameter data. The two vehicle models include a slow velocity model and a high velocity model. In that case, the motion trajectory of the vehicle is provided by blending the two vehicle models.

Blending the two vehicle models may for instance cause to determine a development of vehicle states. This development of vehicle states, noted dx/dt, may advantageously be determined through application of an equation that can be represented as $$dx/dt = s(v) \times f_1(x, u) + (1 - s(v)) \times f_2(x, u),$$

where v is a vehicle velocity, x represent the vehicle states, u are vehicle inputs, $f_1$ is a first function and $f_2$ is a second function of two functions describing the slow velocity vehicle model and the high velocity vehicle model, respectively. Also, s(v) is a modified sigmoid activation function, which is designed such that $s(v)=1$ for $v \le v_1$ and $s(v)=0$ for $v \ge v_2$, where $v_1$ is a lower threshold velocity, $v_2$ is an upper threshold velocity, and $0 < v_1 < v_2$.

At a velocity $v \ge v_2$, the model relied on is the second model. The latter may notably be a nonlinear bicycle vehicle model combined with Pacejka tire models. Note, simplified Pacejka tire models can advantageously be used, as explained later in detail. Conversely, at a velocity $v \le v_1$, the model used is the slow velocity model.

The modified sigmoid activation function may for instance be represented as $s(v)=1/(1+e^v)$ for $v > v_1$ and $v < v_2$, with a continuous transition at $s(v_1)$ and $s(v_2)$.

In embodiments, the modified sigmoid activation function can be represented as $s(v)=0.5+0.5 \sin(\min(0.5\pi, \max(-0.5\pi, v-v_{blend})))$ where $v_{blend}=(v_1+v_2)/2$, with a continuous transition at $s(v_1)$ and $s(v_2)$.

In embodiments, the vehicle model provided comprises three vehicle models, these including a very high velocity vehicle model, in addition to said two vehicle models. The very high velocity vehicle model is described by a function $f_3$, whereby the development dx/dt of vehicle states is determined through application of an equation that can be represented as $dx/dt = s_2(v) \times (s(v) \times f_1(x, u) + (1-s(v)) \times f_2(x, u)) + (1-s_2(v)) \times f_3(x, u)$, where $s_2(v)$ is a modified sigmoid function that is designed such that $s_2(v)=1$ for $v \le v_2$ and $s(v)=0$ for $v \ge v_3$. More generally, the present approach can be extended to any number of vehicle models.

Preferred, however, it to limit it to a few models, in the interest of simplicity of computations performed.

Transforming the motion trajectory typically results in transformed trajectory outputs obtained at a certain output frequency. There, after having transformed the motion trajectory, the transformed trajectory outputs may possibly be resampled at a constant, predetermined frequency, which is preferably higher than said output frequency.

The resampling step may notably comprise interpolating the transformed trajectory outputs using the global vehicle model, so as to compute trajectory points between trajectory points as directly obtained from the transformed trajectory outputs.

States relating to the vehicle may be predicted during an initial step, prior to defining the plurality of line segments. Such states may for instance include a current state of the roadway, a velocity of the vehicle, and a driving reference. In that case, the plurality of line segments can notably be defined according to the predicted states.

In embodiments, the method further comprises predicting an obstacle to obtain obstacle data, which are taken into account for determining the space-time corridor, in addition to the line segments. E.g., embodiments of the present invention relate to a method for steering a vehicle along a path in a structured environment. In such embodiments, the goal is, for the vehicle, to make progress along the road and avoid obstacles by acting on the steering, accelerator, and/brakes, of the vehicle. However, taking obstacles into account is optional, inasmuch as some specific applications (e.g., to test tracks) may assume an absence of such obstacles. Plus, in other embodiments, the obstacle prediction may possibly be activated and deactivated by a user.

The algorithm used to provide the motion trajectory may advantageously make use of a cost function that includes a cost proportional to an inverse of a distance between the vehicle and another vehicle or an obstacle, multiplied by a relative velocity with respect to said other vehicle or obstacle.

Another aspect of the invention concerns a system for controlling an autonomous or semi-autonomous vehicle. The system comprises a control unit having one or more processors, a memory storing a vehicle model and a software program for executing a method according to any of the embodiments mentioned above. The control unit is configured to obtain information describing a roadway, and run the software program, so as for the system to control the vehicle, in operation.

A third and final aspect of the invention concerns a computer program product for controlling an autonomous or semi-autonomous vehicle. The computer program product comprises a computer readable storage medium having program instructions embodied therewith. The program instructions are executable by processing means, e.g., of a system as described above, so as to cause the processing means to implement steps of a method according to any of the above embodiments.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

The accompanying drawings show simplified representations of systems and concepts as involved in embodiments. Similar or functionally similar elements in the figures have been allocated the same numeral references, unless otherwise indicated.

Figure 1:
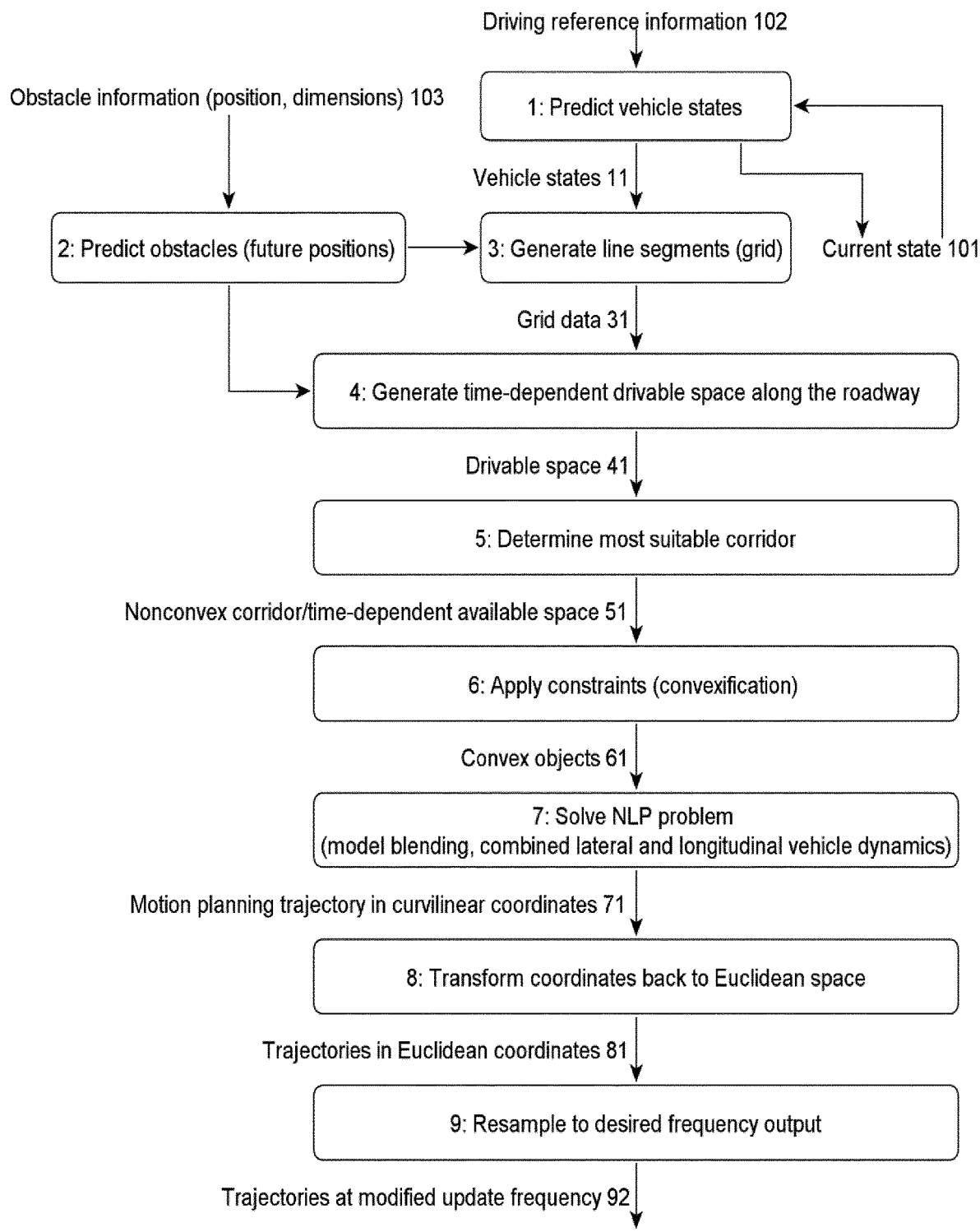
FIG. 1 shows a block diagram (i.e., a flowchart) of a motion planning method according to an embodiment of the invention. Each block corresponds to a high-level step of this method.

Computerized methods and computer program products embodying the present invention will now be described, by way of non-limiting examples.

DESCRIPTION OF PREFERRED EMBODIMENTS

The present invention notably concerns a computer-implemented method for controlling an autonomous or semi-autonomous vehicle, wherein the method first comprises a coarse optimization, which determines a space-time corridor and makes it possible to obtain a time-dependent space available for the vehicle in a curvilinear coordinate space. Then, constraints are obtained, which delimit a plurality of convex space-time objects that approximate said time-dependent space. Next, a finer optimization is then used to optimize a motion trajectory of the vehicle through the convex space-time objects, using a nonlinear programming solver. The obtained trajectory is then transformed to a Euclidean coordinate space, to accordingly control the vehicle.

Some preliminary remarks are in order. To start with, it is an object of embodiments of the invention to improve the controlling results, notably by improving the use of the processor resources, e.g., allowing either computations requiring less processing power or improved and more accurate computations. As a result, the resulting driving performance can be improved.

It is further noted that the segments alluded to in prior art such as US 2015/353082 A1 is a way to provide entry points for a database of the map. Each segment is associated with information such as road curvature. This differs from the line segments as defined in the present invention, where space is longitudinally discretized to approximate the continuous space into a discrete space with finite number of points. The grid/discretization method used in embodiments is such that a higher density of grid points can be defined where the vehicle speed is predicted to be lower (e.g., when the road curves), so as to indirectly embed time information.

Also, in US 2015/345959 A1, lines are needed to define "nodes". This amounts to discretizing the space longitudinally and laterally, and such discretization is uniform, i.e., independent from any other factor such as the vehicle speed or the road condition. The path planner then decides which node to move to in order to make progress. By contrast, in embodiments, space is only discretized longitudinally (leaving the lateral distance continuous, i.e., no approximations are required, laterally) and the discretization steps are non-uniform. E.g., they may be proportional to the vehicle speed.

Embodiments of the present method aim at solving a structured environment, autonomous driving motion planning problem. Such embodiments are optimization-based, deterministic, and may notably feature a detailed dynamic vehicle model to generate dynamically feasible trajectories, e.g., at a rate of at least 20 Hz.

In addition, embodiments assume the presence of obstacles, e.g., moving obstacles. In that case, the general motion planning problem is typically nonlinear and highly non-convex.

Embodiments of the present methods can be regarded as relying on a two-part approach, involving two separate optimization problems. E.g., a coarse optimization is first performed in a low dimensional state-input space, which eventually delivers "convexified" or "quasi-convexified" constraints, i.e., a most suitable space-time corridor to drive in, which is feasible by the vehicle. More precisely, this most suitable corridor can be regarded as a time-dependent space that is most suitably feasible by the vehicle in view of constraints thereof, e.g., a corridor that fulfils certain boundary conditions at each time point. The coarse optimization (corresponding to blocks with reference numerals 1 to 6 in FIG. 1) provides an initial solution in the area of a local minimum. During the second part (block with reference numeral 7 in FIG. 1), an efficient, nonlinear programming (NLP) algorithm solves for the optimal trajectory of an accurate vehicle model through the convex space-time objects obtained thanks to the most suitable corridor. The model used at block 7 may notably be a velocity-dependent blend of two or more vehicle models.

The terminology "model" refers to a set of data defining a vehicle and its behavior. Several known models can be relied on, such as the so-called bicycle model and the Pacejka tire model, and, for low speeds, the "kinematic model". Such models can be used in the optimization step (corresponding to reference numeral 7 in FIG. 1).

Moreover, the model used may further comprise additional data, which can for instance be taken from the group encompassing the mass of the vehicle, the minimum steering radius, and the class of the vehicle (e.g., lorry, SUV, small car, sports car, limousine). A simplified version of the model data is typically used in the first part of the optimization, i.e., the coarse optimization corresponding to steps 1 to 6 in FIG. 1.

Both parts (i.e., steps 1-6 and 7 in FIG. 1) together allow a motion planning optimization problem to be efficiently solved and executed quickly enough for practical use. The first part, relating to the most suitable corridor, may notably achieve this by reducing the number of and transforming (convexify) the inequality constraints that the optimizer uses during the second part (step 7). This convexification allows the number of equality constraints used in the NLP optimizer (step 7) to be reduced.

As noted above, a model blending may be relied upon, which allows a seamless use of two or more different vehicle models. For instance, a dynamic model can be used, which has high-fidelity at high speeds but makes the problem intractable at low speeds because of singularities. Thus, a so-called kinematic model may be used at lower speeds, which removes the singularities.

For example, at high velocities the model used may be a nonlinear bicycle vehicle model combined with Pacejka tire models. The Pacejka models can advantageously be simplified. Namely, the simplified model may use the standard Pacejka "Magic Formula", in which the curvature coefficient parameter (usually called "e") is set to zero. The resulting model involves eight states (longitudinal force/acceleration, steering angle, $v_x$, $v_y$, yaw-rate, s, w, relative heading) and two control inputs (longitudinal jerk, steering rate). Here, $v_x$ is the forward longitudinal velocity of the vehicle, $v_y$ is the lateral velocity of the vehicle, s is the position of vehicle along the path (in curvilinear coordinates) and w is the position of vehicle perpendicular to this path (in curvilinear coordinates). At low velocities, the vehicle model used may for example be a simpler kinematic model with four states only (x and y coordinates, velocity and heading) and no tire dynamics. Such a model makes it possible to deal with mathematical singularities encountered at low speeds by the high-fidelity model. At medium speeds, a blend of the two models can be used in such a way that the transition is seamless and that the difference in number of states is automatically catered for.

Due to the structured environment of most roads, the coordinate system is chosen to be a Frenet-Serret frame (also called TNB frame, i.e., a system of curvilinear coordinates), defined by a reference line along the road. This simplifies the optimization formulation, it being noted that, in embodiments, an objective is to minimize time to travel along the direction of the road and minimize the lateral deviation from a central line, e.g., the line running between the lateral road boundaries (edges), which may correspond to the reference line. Especially advantageous is that the distance to obstacles can be handled as in longitudinal and lateral distance within lanes even though the road is curved, which would be much more difficult to handle in Euclidean coordinates. The downside of this approach is the need for two coordinate transforms, to transform (i) the input data from the Euclidean space into the curvilinear space and then (ii) the optimized data from the curvilinear space back into the Euclidean space.

The motion planning problem can be discretized on a grid in space. In addition, time can be discretized as well, as assumed in step 3 of FIG. 1. In the nonlinear programming (NLP) solver, the longitudinal distance along the road is typically fixed, while time is typically a variable.

Another advantage of the present approach is not to generate a huge number of candidate trajectories. Rather, the present invention aims at determining a most suitable trajectory based on a suitable corridor. That is, a first part of the optimization is based on corridors only (through which an infinite number of trajectories may possibly be devised), rather than many potential trajectories, which simplifies the problem.

In reference to FIG. 1, a first aspect of the invention is now described, which concerns a computer-implemented method of controlling an autonomous or semi-autonomous vehicle. Note, this method and its variants are collectively referred to as "the present methods" in this document. FIG. 1 shows as an overview a block diagram relating to a motion planning method according to embodiments.

The computer system used to implement the present methods may be assumed to be provided with a global model of the vehicle to be controlled. The global model may for instance include at least two sub-models for the vehicle, including one sub-model for low velocities and a different sub-model for high velocities, as assumed in the following for illustration purposes. As noted earlier, each sub-model of the vehicle comprises data relating to the vehicle. The global model may furthermore include additional parameters, here called model parameters (captured as model parameter data), pertaining, e.g., to a class of vehicles and/or a physical property, such as steering capacity or the mass of the vehicle.

The data of the overall global model may for instance be organized as a data vector, adequately stored in a computer or system used to implement the present methods. In that case, this vector may for example include a slow velocity model part, a high velocity model part, and a simplified class model (or simplified parameter model part). Note, this "class" may imply certain physical properties (such as the mass) of the vehicle. The parameter model part provides input for the method as well, as in embodiments described below.

The first part of the method (blocks 1-6 in FIG. 1) notably allows the creation of a feasible space-time corridor, i.e., a corridor defined in both space and time. Generating such a corridor is mathematically nontrivial as it involves a coordinate transformation, optionally the generation of a non-uniform grid, optimized for lane geometry, as well as the generation of a time-dependent drivable space, from which the space-time corridor is derived. The space-time corridor makes it possible to determine a time-dependent space available for the vehicle, e.g., a space defined in one (lateral) space dimension and one time dimension, for each longitudinal grid point. The most suitable corridor can be identified via the solution of an optimization problem. This optimization may for instance be achieved via dynamic programming, A*, or Dijkstra's algorithms, e.g., involving a heuristic search approach. The first part of the optimization further involves an approximation (here also called convexification) to define constraints that are used during the second part. The second part (block 7 in FIG. 1) involves a nonlinear programming solver to optimize a motion trajectory of the vehicle based on the space-time corridor identified in the coarse optimization.

The function of each block in FIG. 1 is now described in detail.

The block with reference numeral 1 (optional) is related to the prediction of vehicle states. Here, current measurements, current states 101 of the vehicle, and driving reference information 102, are used to estimate further vehicle states 11 as output. The predicted states 101 include vehicle-related information, such as position, velocity, current acceleration, steering direction, etc. Other vehicle-related information, such as the vehicle dimensions (which may include, e.g., one or more fixed parameters), may possibly be included in the predicted vehicle states. The driving reference information 102 may for example comprise information about the driving possibilities of the vehicle, such as possible ranges of accelerations (positive and negative), possible ranges of steering, as well as comfort levels (or ranges) for such values. This information 102 further includes roadway information (the local geometry of the route), e.g., a sequence of waypoint defining the lane (and, therefore, the road) boundaries.

The block with reference numeral 2 (optional) is related to the prediction of future obstacles positions. Here, information about dynamic obstacles 103, especially positions, are used to generate a prediction of future positions of the obstacles. Obstacles predictions 21 are based on the analysis of moving or standing obstacles. The obstacle prediction is similar to the prediction of states of the ego vehicle 90, though it is applied to obstacles. Such predictions may, actually, merely shift the already predicted obstacle trajectories in time to match a new start time of the predicted vehicle states. More generally, obstacle predictions can involve acceleration and steering predictions. The obstacles may for instance be pedestrians, bicycles, cars, etc. Obstacles prediction is known per se.

Figure 2:
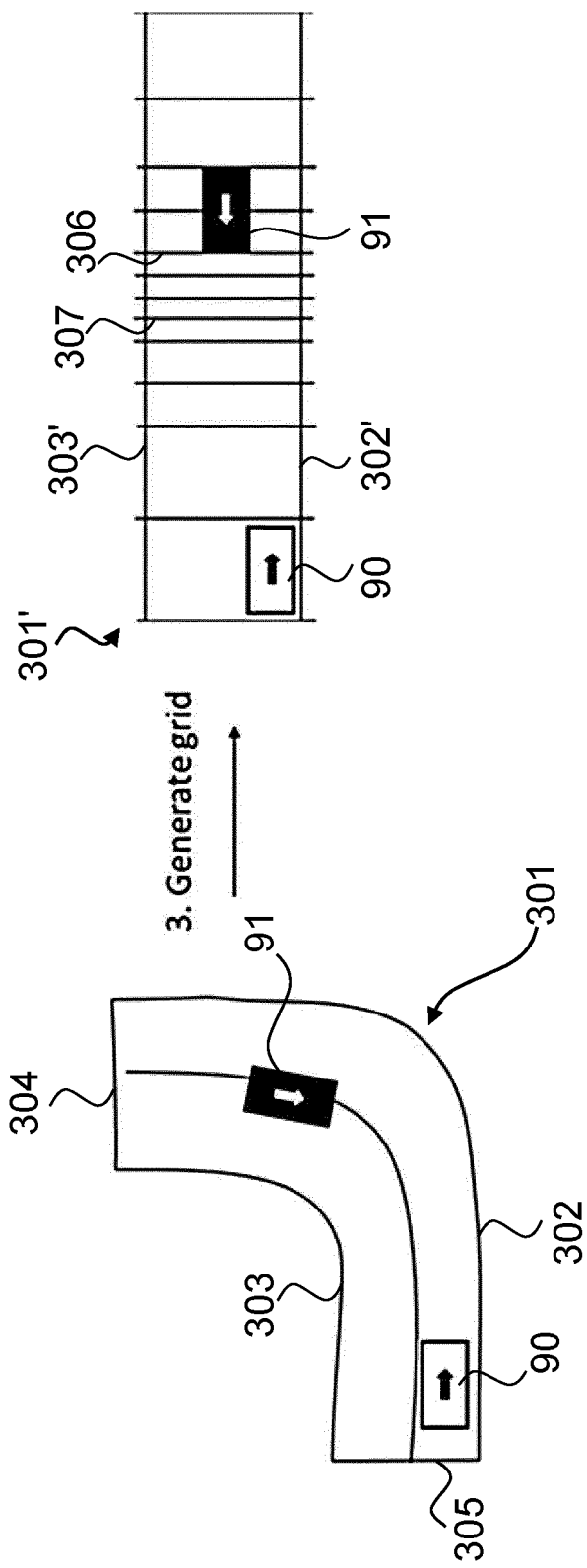
FIG. 2 illustrates the generation of the line segments, corresponding to block 3 of FIG. 1, i.e., the transformation of an environment defined in a Euclidean space into an environment defined in a curvilinear space, as involved in embodiments.

The block with reference numeral 3 relates to the generation of line segments, also referred to as grid generation in this document. The line segments are parallel to each other, hence forming a framework of spaced line segments, i.e., a grid. The surface the vehicle is driving on, e.g., corresponding to a road surface, is discretized in space and its coordinates are transformed to curvilinear coordinates, as illustrated in FIG. 2. The vehicle states 11, which also includes road information, can be used as inputs to obtain a grid 31 as output. Such an output may comprise a plurality of values relating to the grid itself and the vehicle evolving through it. That is, the grid 31 may typically be calculated on the basis of the vehicle states 101 as predicted at step 1, although it may also be calculated based on a speed-independent part of the vehicle model, e.g., using model parameters of the vehicle model and road information, or, even, road information only, as obtained from data 102. The grid may possibly be generated independently of the obstacle prediction. However, in variants, the obstacle prediction may influence the grid generation (as assumed in FIG. 1), e.g., to limit the speed and ensure recursive feasibility for obstacles that are, currently, still beyond the solver horizon.

FIG. 2 illustrates the generation of a grid (corresponding to block 3 in FIG. 1), i.e., the transformation of environment data in the Euclidean space (on the left-hand side of FIG. 2) into curvilinear coordinates (right-hand side), where the underlying environment is discretized. Accordingly, and as seen in FIG. 2, a plurality of line segments 306, 307 are defined (at step 3, FIG. 1) along the roadway, at locations spaced longitudinally along a reference line defining the Frenet-Serret frame, here between a starting position 305 and a point that defines potential progress 304 of the vehicle along the roadway. The actual reference line is unimportant; it may be any line parallel to the frame. The line segments have respective lengths extending, each, perpendicularly to the reference line. Such lengths correspond to widths of a drivable space along the roadway. Such widths will typically vary along the roadway.

The discretization is preferably performed so as to minimize the number of points (i.e., corresponding to intersection points between the line segments and the reference line). Of course, it is possible to choose more points, but the problem complexity will then increase unnecessarily and require more computing power. Too few points, and the problem approximation will lead to poor performance. So, a trade-off can advantageously be found, e.g., based on any suitable heuristic. The location of the discretization points can for instance be computed using information about the local road curvature, which is also an indication as to potential vehicle speed physical limits along that path and comfort limits, e.g., minimal/maximal lateral acceleration, as available from the model parameter part of the global vehicle model.

FIG. 2 shows, on the left-hand side (LHS), the road 301 with a right edge 302 and a left edge 303. On the road portion 301 is shown an obstacle 91. In this example, the obstacle 91 is assumed to be another vehicle driving in opposite direction to the vehicle 90 (the ego vehicle). In other situations, the obstacle may be a vehicle driving in the same direction as vehicle 90 but slower, or a standing obstacle, such as a lane divider. Such obstacles can, in practice, suitably be detected and transformed into data that can be taken into consideration by the present methods. For the present purpose, the problem of obstacle detection and prediction is assumed to be solved using any suitable known methods. Note, the road may possibly include standing obstacles. A standing obstacle may possibly be detected and taken into consideration for prediction purposes. However, such a standing obstacle may also be encoded in the road information; in that case, not explicit obstacle prediction is required.

A road portion 301 as shown in FIG. 2 may for example correspond to a space that is currently being considered (i.e., "visible") by the present methods and systems according to the invention. The road portion 301 is limited, in the forward direction, by the front edge 304, which connects the left edge 303 with the right edge 302 on one side of the depicted road portion. The back edge 305 can for example be that edge that delimits the back of the vehicle 90, although this edge may also take into consideration overtaking vehicles. The back edge 305 closes the road portion 301 for it to form a closed surface.

The grid generation 3 transforms the road 301 into a transformed road 301' with a transformed right edge 302' and a transformed left edge 303'. The grid data includes a plurality of line segments 306, 307. The line segments are perpendicular to a fictious line, corresponding to said reference line. This reference line may for instance correspond to either one of the edges 302' and 303' in this example. Where the road is locally narrowing or enlarging, the reference line may for example be taken as an average or median line. The line segments 306 are located at distances from each other, where such distances may depend on the current road section. In the example of FIG. 2, the line segments 306 are denser near the obstacle 91 (in the direction of movement of the obstacle 91) than behind or near the vehicle 90. However, the grid may also happen to be denser around the obstacle 91 where a lower vehicle speed is expected, e.g., due to the local curvature of the road.

The block with reference numeral 4 (optional) is related to the generation of a time-dependent drivable space along the roadway, i.e., a quantity defined in both space and time coordinates. Input data may notably include obstacles predictions 21 as well as grid data 31. The solution outputted comprises data relating to a drivable space 41, for each time point. A drivable space is a 2D space in which the vehicle may possibly fit and through which the vehicle may possibly drive, in principle. This way, several spatial corridors may potentially be generated at one or more time points.

Figure 3:
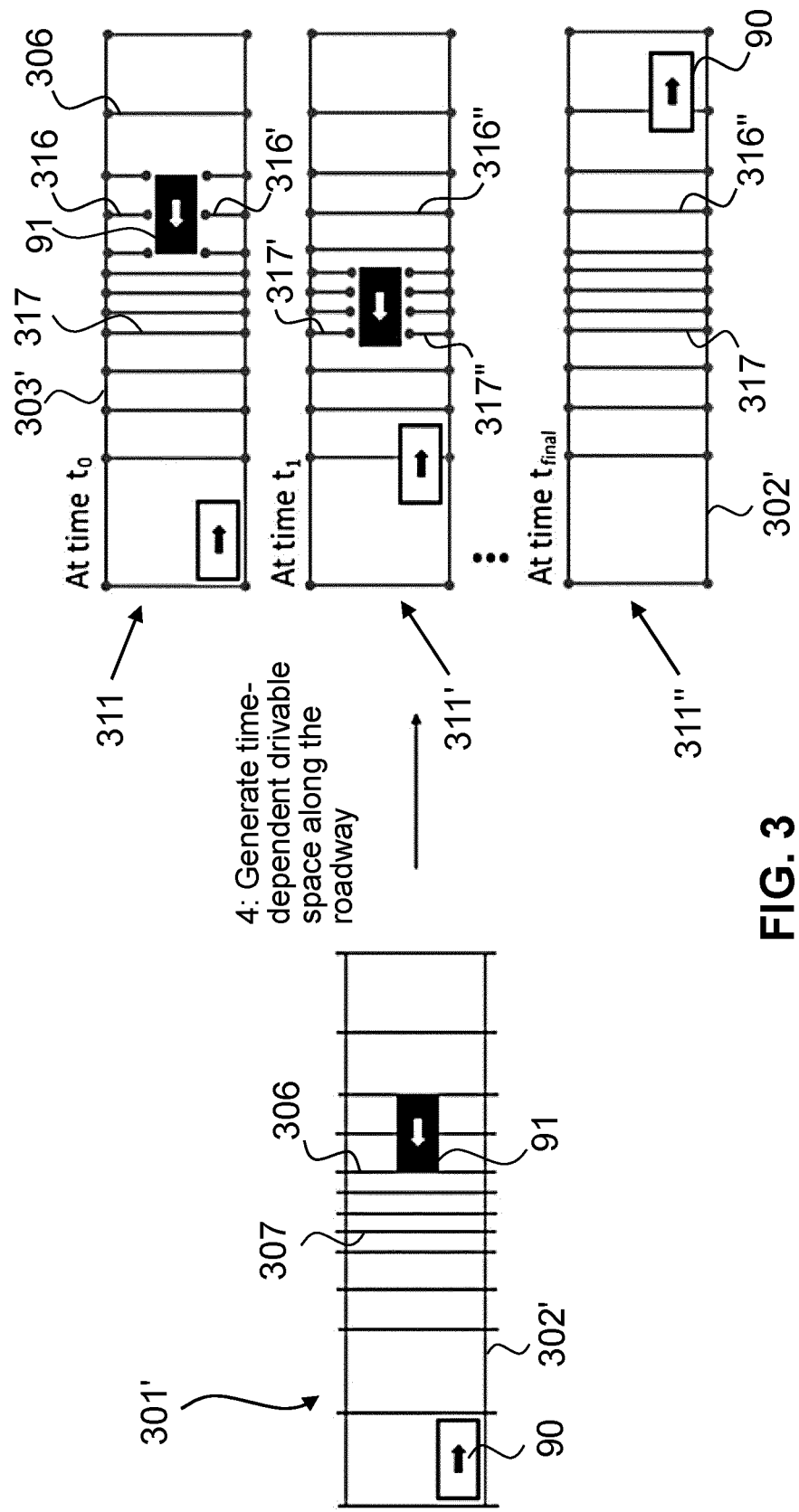
FIG. 3 illustrates the generation of a time-dependent drivable space along the roadway (corresponding to block 4 of FIG. 1), based on the generated line segments of FIG. 2, as in embodiments.

FIG. 3 shows examples of such spatial corridors at distinct time points (or time steps). On the LHS of FIG. 3, a representation of the input data (the grid data 31) is shown, which corresponds to data shown on the right-hand side (RHS) of FIG. 2. As explained earlier, the grid data 31 may consist of a dataset obtained based on a road portion (i.e., a closed surface), which, once transformed, gives rise to a transformed portion 301', with a transformed right edge 302' and a transformed left edge 303'. Again, two specific line segments 306 and 307 are identified in this example. As seen on the RHS of FIG. 3, a time-dependent drivable space is computed for each time point; the resulting grids 311, 311' and 311" are shown on the RHS of FIG. 3, for three exemplary time points only.

Note, the input grid 301' spans a space that is agnostic to the opposite vehicle 91. However, the density of line segments preferably takes the vehicle 91 into account, as discussed earlier. On the contrary, the output grids 311, 311', 311" split the drivable space, where necessary, to take into account the opposite vehicle 91. This effectively leads to two potential corridors at the level of the vehicle 91 in the grids 311 and 311'. In that sense, the time-dependent drivable space determined at step 4 of FIG. 1 may draw several spatial corridors (at one or more time points).

In this example, the movement of vehicle 90 is calculated and predicted (at step 1, FIG. 1) to move through the grid over time (from the top grid 311 to the bottom grid 311"). The obstacle 91 causes to divide line segments such as segment 306 into interrupted line segment portions 316 and 316', spaced by a lateral gap corresponding to the lateral dimension of the obstacle 91. At time $t_1$, the obstacle 91 is predicted to have moved with respect to its position at time to, such that the interrupted portions 316 and 316' in grid 311 are replaced by an entire line segment 316" in grid 311'. Meanwhile, on the front side of the vehicle 91, the predicted movement of this obstacle 91 results in that an initially complete line segment 317 separates into separated line segments 317' and 317" on each lateral side of the obstacle 91. Note, if the obstacle 91 is very close to an edge (here the edge 303'), then it may well be that the split results is only one (albeit shorter) interrupted line segment on one side of this obstacle. To summarize, in block 4, data related to the road 301' is calculated over time and for each time slot (of, e.g., 20 ms), a succession of line segments is transformed into another succession of line segments, which may be locally split to form line segment portions 316, 316' and 317', 317", hence forming several spatial corridors, through which the vehicle 90 may potentially drive.

Note, in other scenarios, the obstacle 91 may be a standing obstacle encoded in the road information. This may similarly cause to split an input grid to form a corridor that locally splits (effectively forming several spatial corridors), without requiring any obstacle prediction.

The block with the reference numeral 5 in FIG. 1 relates to the determination of a most suitable space-time corridor 51, i.e., corresponding to a time-dependent drivable space that is feasible by the vehicle 90, yet given certain constraints, as opposed to the time-dependent drivable space obtained in output of block 4, which is agnostic to such constraints. The space-time corridor 51 may for instance be determined by solving an optimization problem using, e.g., a dynamic programming algorithm, a so-called A* algorithm, or a Dijkstra's algorithm, or by applying a heuristic search. The solution of this optimization problem (and of the corresponding algorithm) is used to find the most suitable corridor, e.g., one that is feasible, safe, and that results in a largest amount of options (a largest solution space), as per the constraints imposed. This optimization problem can typically be formulated based on a cost function and constraints. The cost function aims at maximizing or finding the largest space-time volume available. The constraints may notably reflect the vehicle dynamics (input through the parameter model part), the obstacles, and driving rules. The output of the block 5 includes data relating to this most suitable corridor 51.

Importantly, this most suitable corridor 51 makes it possible to simplify and reduce the search space used in the subsequent local optimization problem (step 7 in FIG. 1), which typically uses an NLP solver such as the open source IPOPT solver or a proprietary solver such as FORCESPRO. Other solvers may possibly be used. The most suitable corridor 51 can be regarded as bridging a coarse optimization problem (where the vehicle states are roughly predicted) to a finer optimization problem (where the vehicle trajectory is precisely determined).

Figure 4:
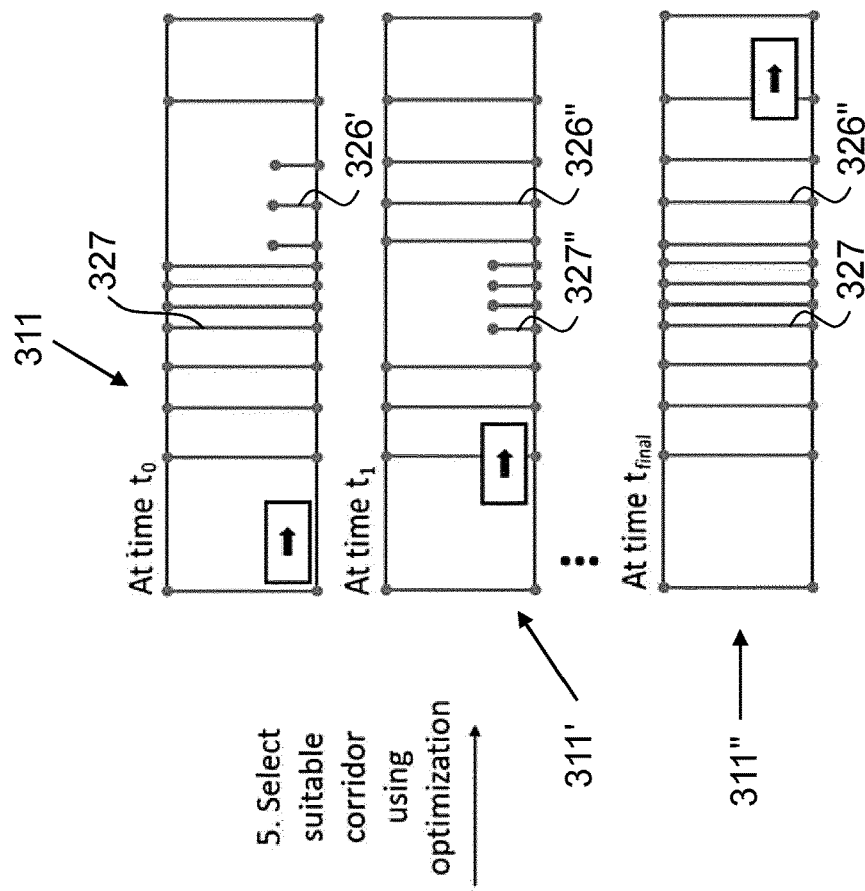
FIG. 4 illustrates the determination of a most suitable space-time corridor (corresponding to block 5 of FIG. 1), based on the time-dependent drivable space of FIG. 3, as in embodiments.
Figure 4:
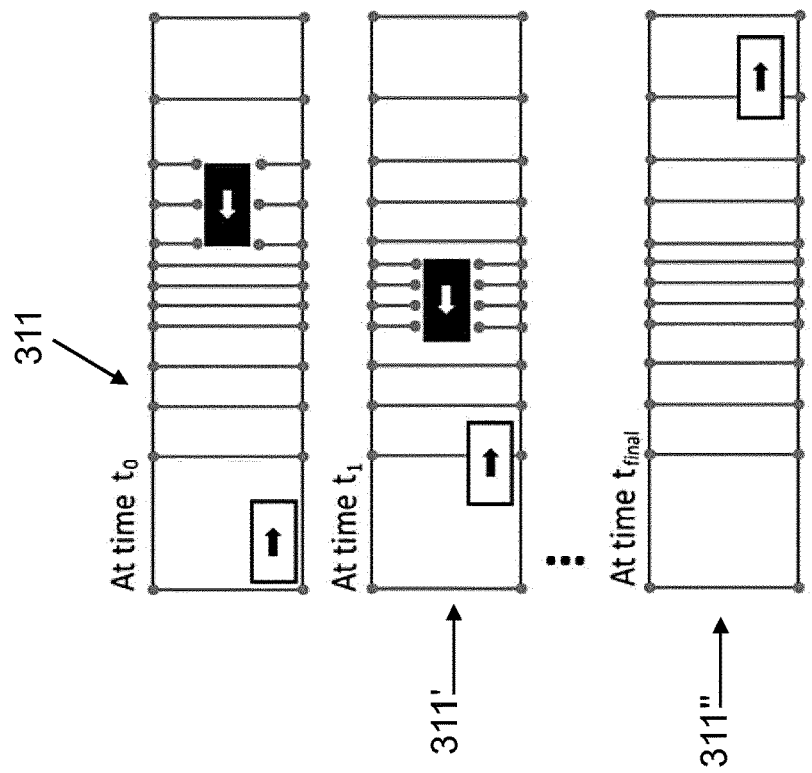

FIG. 4 illustrates the determination of a most suitable space-time corridor 51 according to block 5 of FIG. 1. On the LHS are shown the grids 311, 311' and 311" as obtained for times $t_0$, $t_1$ and $t_{final}$ in output of FIG. 3. The spatial parts of the selected corridors correspond to the residual line segments and line segment portions in the RHS of FIG. 4. In this example, the method determines that the spatial parts of the most suitable corridor include the rightmost portion 326' at to and the rightmost portion 327" at $t_1$. At $t_{final}$, the line segments 326" and 327 are not interrupted any longer and, therefore, no selection is needed. Note, the spatial parts of the corridor form, together with the temporal information ($t_0$, $t_1$, . . . , $t_{final}$), a space-time corridor.

As exemplified above, the spatial parts of the most suitable corridor are contained in the spatial parts of the time-dependent drivable space as previously determined at step 4. I.e., at each time point, the spatial part of the most suitable corridor forms a subset of the corresponding drivable space, as considered in input to step 5, or is equal to it. In variants where no obstacle is involved, the most suitable corridor may be more straightforwardly determined, e.g., based on the sole road information and the line segments as determined at step 3 of FIG. 1. In that case, at each time point, the spatial part of the most suitable corridor will be contained in and possibly equal to the drivable space spanned by the line segments obtained for this time point, in accordance with the imposed constraints. In other words, the space-time corridor is determined according to one or more constraints for the vehicle, such that, at each time point, a spatial part of the space-time corridor determined is contained in a corresponding spatial part of the time-dependent drivable space used as input to step 5.

The block with reference numeral 6 is related to the "convexification" of constraints. I.e., non-convex constraints are "convexified" to improve the performance of the NLP solver. E.g., a function may be generated 6, which defines bounds for the vehicle 90 within the time-dependent space that is determined to be available for the vehicle at each time step and each grid point, based on the most suitable corridor 51 determined at step 5. Such bounds define a set of constraints that delimit a convex space-time, which approximates the time-dependent space available for the vehicle. In other words, the most suitable corridor gives rise to a time-dependent available space, which is approximated by convex (or quasi-convex) objects (i.e., corresponding to a space-time). Such convex objects are substantially more tractable for the NLP solver than raw shapes, which may be non-convex (and possibly highly non-convex). Data 61 relating to the most suitable corridor 61 or the time-dependent available space is the output of step 6.

Figure 5:
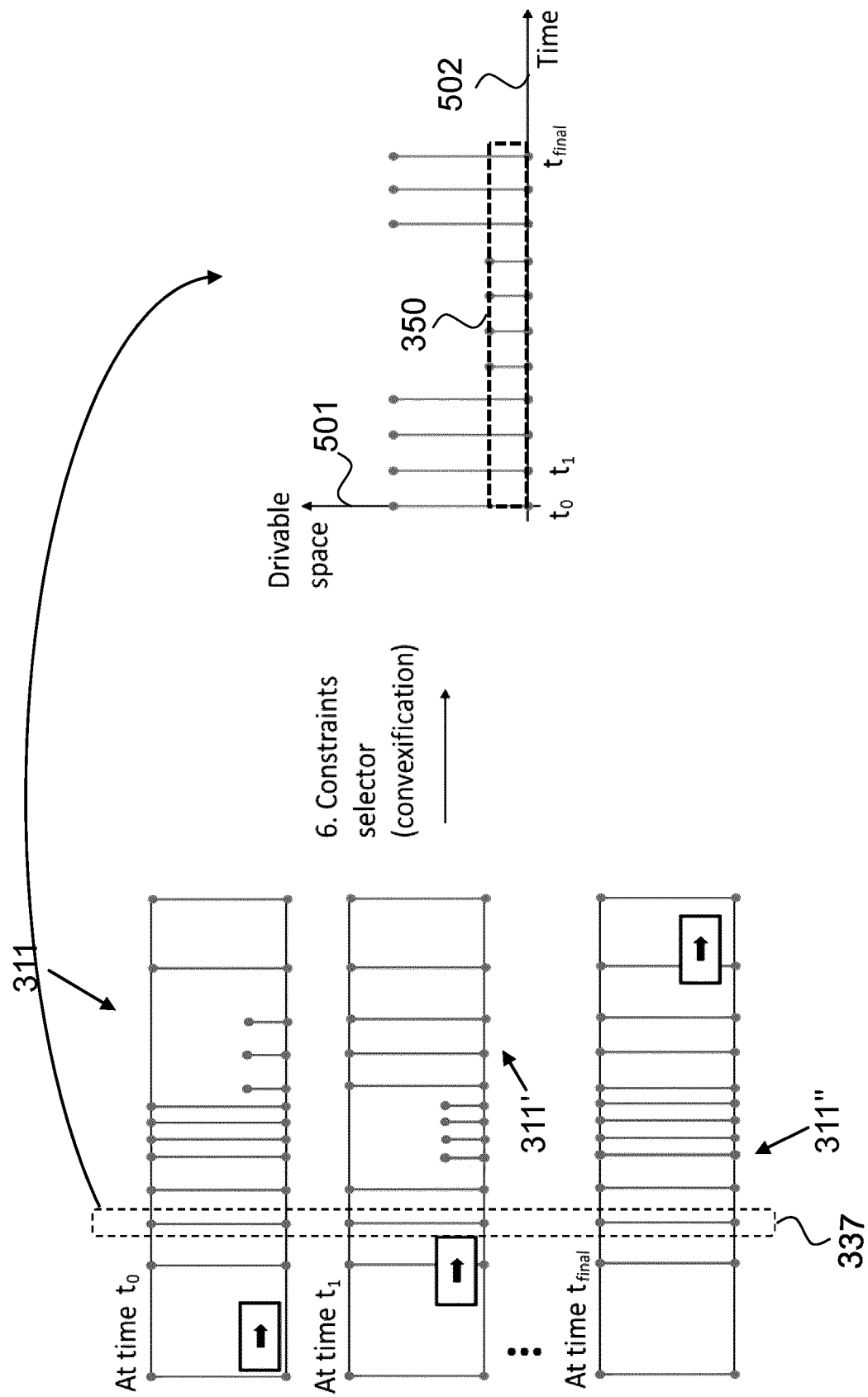
FIG. 5 illustrates a convexification step (corresponding to block 6 of FIG. 1), based on the most suitable space-time corridor determined in FIG. 4, as in embodiments. The convexification step causes to define, for each longitudinal grid point, a convex shape (here a rectangle). The plurality of convex shapes obtained approximate a time-dependent space that is available for the vehicle.

FIG. 5 illustrates the space-time convexification. The axes of the RHS graph shown in FIG. represents a space-time, which is subtended by one space dimension 501 and the time dimension 502. The y-axis 501 reflects the lateral space that is available for the vehicle over time and for any grid point. That is, for each time point ($t_0$, $t_1$, . . . , $t_{final}$) and each longitudinal grid point, the lateral space (i.e., width) available for the vehicle between the RHS and LHS edge of the roadway is translated into a line segment. I.e., in the RHS graph of FIG. 5, each line segment corresponds to the width available for the vehicle at each time point, for a selected longitudinal grid point 337. By contrast, the LHS of FIG. 5 depicts spatial corridors for each time point, where the spatial corridors correspond to (2D) drivable spaces along the road, as obtained at each time point. So, the horizontal axis corresponds, in each of the LHS graphs, to the reference line.

Next, the available space derived from the space-time corridor is approximated by a convex shape, a rectangle 350 in this example. In otherwords, bounds are obtained 6 for the vehicle within the time-dependent space available for it. Such bounds define a set of constraints delimiting a convex space-time surface, which approximates the time-dependent space available for the vehicle, for a given grid point (i.e., at a given location along the reference line). Note, the rectangle is contained in the time-dependent available space in this example. More generally, though, the approximation achieved by a convex shape does not need to be exactly contained in the corresponding space-time surface drawn by the time-dependent space available for the vehicle.

In the example of FIG. 5, only one 2D convex shape is depicted, as obtained for a selected grid point 337. However, a similar extraction can be performed for each longitudinal grid point, so as to recover the longitudinal information. This way, a plurality of 2D convex shapes are obtained. Such objects can for instance be captured by a dataset aggregating multiple data for each longitudinal grid point, each data representing an object that is convex. Note, this convexification procedure is not influenced by the model parameters. The resulting convex space-time objects form a suitable input for the next step (block 7 in FIG. 1).

The block with the reference numeral 7 is a block of operation performed in view of planning a motion trajectory. It is preferred to apply this block 7 within the framework of a motion planning solution for various speeds of the vehicles. It is related to the solution of the NLP problem with, e.g., models blending and lateral and longitudinal vehicle dynamics. The input for this block is the plurality of convex space-time objects, as discussed above. The solution of the NLP problem gives rise, as output of block 7, to motion trajectories in curvilinear coordinates 71.

The block with the reference numeral 8 concerns the transformation of coordinates back to the Euclidean coordinates. The output of this block 8 is related to data of motion planning trajectories in Euclidean coordinates 81, i.e., a back transformation from the Frenet-Serret coordinates as used from the grid generation block 2 in FIG. 1.

Finally, the block with reference numeral 9 is related to resampling the output of block 8. Indeed, in embodiments, because of the inability to predict the exact time it will take to solve the NLP in block 7, the output of block 7, and consequently the output of block 8, are not provided at a constant frequency (i.e., the output rate is not fixed). To allow for a constant frequency output at any desired resolution and/or a higher update frequency rate, block 9 performs a resampling of outputs of block 8 to any desired frequency (possibly higher). Block 9 may notably interpolate the output of block 8 to calculate trajectory points that exist between the trajectory points outputted by block 8. This makes it possible to support any desired resolution output. The motion planning trajectories 92 can accordingly be updated at a higher frequency, if needed. Also, in embodiments, the trajectories are resampled to a higher frequency, but they are sent (for vehicle control purposes) at a frequency at which they are computed. So, a distinction may be made between the frequency at which messages are sent and the sampling frequency used to sample the trajectories outputted.

Additional embodiments are now discussed, which concern operations performed at block 7. Comments are in order:

To be safe at the limits of handling (high speed or low friction), it may be necessary to take into account nonlinear mathematical models to describe the vehicle dynamics (especially of the tires, but also suspensions, weight transfer, etc.).

To perform path planning with nonlinear models for the vehicle dynamics, it may be required to obtain results continuously. E.g., a new solution may have to be available every 20 milliseconds (at least), as the vehicle progresses, which gives rise to a complex mathematical optimization problem.

Such complex optimization problems can currently not be solved quickly enough (e.g., within 20 ms) in standard vehicle computers. In particular, method steps as discussed earlier in reference to blocks 1 to 6 and 8 may possibly be applicable when the speed is always low, or the speed is always high. Therefore, embodiments are disclosed in the following, which allow such a complex problem to be solved fast enough for practical use.

The main assumptions for blocks 1 to 6 and 8 remain unchanged. That is, the problem is decomposed into two subproblems, whereby (i) a safe and feasible drivable space and continuous time coordinates is found and (ii) an optimal path/trajectory is determined within that space, via an NLP solver.

Such embodiments involve a model blending, in order to: (i) deal with mathematical singularities when solving the mathematical optimization problem and (ii) only use the relevant vehicle model, i.e., the model having the lowest complexity, when sufficient. Model blending means choosing from the global model the adapted velocity model or—in a transition region—a combined velocity model as explained below.

Block 7 is now related to determining the solution of an NLP problem involving model blending as well as combined lateral and longitudinal vehicle dynamics. The advantages of such a model are to eliminate mathematical singularities (analogous to divisions by zero) at low velocities while allowing more accurate models to be used at high velocities. Furthermore, this allows the solution of a more manageable mathematical optimization problem to be found by eliminating unnecessary computations with the advantage of increased computational speed. A cost function is defined to solve the NLP problem in block 7. The NLP solver minimizes this cost function. The cost function may notably include a cost proportional to the inverse of the distance to other vehicles/obstacles multiplied by the relative velocity with the other vehicles/obstacles. I.e., this cost is high when the relative velocity is high and/or when the distance is small. So, in order to minimize the cost function, the NLP solver needs to reduce the relative velocity (normally by reducing the vehicle velocity) and/or reduce the distance (by allowing more clearance space to other vehicles/obstacles where their relative velocity is higher).

The two models are to be blended smoothly, i.e., avoiding jumps when transitioning from one model to another. Such a smooth transfer can for instance be achieved through application of the equation $$dx/dt = s(v)f_1(x, u) + (1 - s(v))f_2(x, u)$$

where, v is the vehicle absolute velocity, x are the vehicle states (such that dx/dt represents a development of the vehicle states over time), u are the vehicle inputs and $f_1$ and $f_2$ are the two functions describing the vehicle models to be blended. Furthermore, s(v) can advantageously be chosen as a specific step function, namely as a modified sigmoid activation function, which is defined as $$s(v) = 0.5 + 0.5 \ \sin(\min(0.5\pi, \max(-0.5\pi, v - v_{blend})))$$

where "sin" is the sine function, "min" is the minimum operator, "max" is the maximum operator, $\pi$ is the Archimedes constant (i.e., 3.14159 . . . ), and "$v_{blend}$" is the parameter that defines the velocity at which the blending takes place.

Traditional sigmoid functions asymptotically converge to zero or one, meaning that both models would be always "active". By contrast, the above s(v) function will be exactly zero for some small velocities v and exactly 1 for some large velocities v, such that only one model will be active most of the time. As a result, computations are simplified and can be more quickly performed.

Other embodiments rely on a different modified sigmoid function with two threshold velocities. Assume that $v_1$ is a lower threshold velocity, $v_2$ is an upper threshold velocity, $v_{max}$ is the maximum reachable velocity of the vehicle, and $0 < v_1 < v_2 < v_{max}$. Then, s(v) can be defined as $s(v) = 1/(1+e^v)$, with $s(v) = 0$ for $v \le v_1$ and $s(v) = 1$ for $v \ge v_2$. Such a function ensures that where sufficiently slow or high velocities are involved, only the relevant model is used since the input of the other model is excluded (owing to multiplier 0 as parameter from the speed indication), while blending takes place (in the sense that both models contribute to the result) only in a defined transition zone for a reduced interval of velocity between two thresholds.

Such a blended model is only used in block 7 in FIG. 1. As mentioned above, a simplified version of the parameter model data are used in blocks 3 and 5, where no use is specifically made of the different velocity models of the global vehicle model.

In other embodiments, the blended model may involve three different velocity bands, the third being associated with a function $f_3(x, u)$. So, beside the first modified sigmoid function (to switch between the first and the second model around threshold velocities $v_1$ and $v_2$ or blending velocity $v_{blend}$), a second modified sigmoid function $s_2(v)$ can be applied, e.g., in a multiplication with the first modified sigmoid function, for a similar blending threshold velocity, to switch the value $s_2(v)$ between 0 and 1. For instance, this may be achieved with the equation:

$$dx/dt = [s(v)f_1(x, u) + (1 - s(v))f_2(x, u)](1 - s_2(v)) + s_2(v)f_3(x, u).$$

As noted earlier, a novel feature of the present approach is related to the determination of a safe and feasible corridor (in space and time). It is advantageous to simplify the mathematical optimization problem such that a path can be found in real time (less than ms). To that aim, it is necessary to solve the coarse optimization problem in a very short time. While a full search method will search for a solution in a multi-dimensional space (e.g., including two space dimension, time, and other dimensions taking vehicle-related aspects such as orientation into account), blocks 3-5 in FIG. 1 may advantageously reduce this to three dimensions only (one temporal and two spatial dimensions including lateral and longitudinal axes), which reduces the problem size and, therefore, the optimization duration.

Note, the space-time corridor obtained at step 5 is much larger than previously proposed corridors because it includes a large share of the potentially feasible trajectories. This gives the motion planner more freedom to find trajectories, e.g., with a large safety margin and which are sufficiently smooth and comfortable for the vehicle passengers.

Such a space-time corridor contains an infinite number of potential trajectories (as opposed to, e.g., search-tree methods), allowing the solver to choose from a larger solution space. The number of trajectories is, in principle, infinite because the time dimension and the lateral space (width) dimension are continuous in the convex space-time objects. I.e., each of such convex objects spans a continuous space-time. The sole residual discretization arises due to the discrete locations along the reference line, which is precisely the reason why several convex objects are produced. Still, the optimization problem of step 7 can be solved in time. Thus, the solver is provided with an infinite number of options as input. The task of the NLP solver is then to find a solution in this (partly) continuous solution space.

Of course, the NLP algorithm involved in the solver may still cause to discretize the space-time for solving the optimization problem. However, such a discretization can be optimally designed for and performed by the NLP solver, rather than being imposed by the input data fed to the solver. And this allows the computation of the trajectories to be more efficiently and accurately performed. That being said, the NLP solver may, in variants, possibly rely on a same time discretization as used to produce the convex shapes it uses as input.

The corridor determination also makes the subsequent NLP problem easier to solve by "convexifying", in block 6, the constraints used in block 7 in FIG. 1. In block 6, suitable convex objects are used to approximate the drivable space.

Several kinds of approximations can be contemplated to determine the convex objects. The convex shape may notably represent a lower or upper bound to the available width w over time. So, in that case, when executing step 7, the available space (width) w can for example be constrained according to the inequality $$w\min(t) \le w \le w\max(t)$$

where each of wmin(t) and wmax(t) is a convex or quasi-convex function of time, such that w is constrained to a convex space-time. Time can be constrained too, e.g., if there is an obstacle. The width w can be regarded as a measurement on any line segment; it connects the corridor to the NLP problem. E.g., each of the wmin(t) and wmax(t) can for example be constants and therefore is convex; such bounds define an inner space that is a convex object in the space defined by axes t and y. In variants, each of wmin(t) and wmax(t) can be a box or a triangle (i.e., any suitable convex shape), while still delimiting an inner convex shape (i.e., a convex 2D object) in the space defined by t and y.

Moreover, embodiments combine lateral and longitudinal vehicle dynamics. By utilizing a vehicle mathematical model with combined lateral and longitudinal dynamics including tire forces, the solution space (and therefore safety) is increased by enlarging the drivable envelope. This is not the case when the longitudinal and lateral dynamics are decoupled (i.e., considered independently).

Additional comments follow.

Utilizing such models increases the computational complexity, but it is still possible to restore complexity to manageable levels by other means, notably thanks to simplified model data used in the first part of the optimization;

Changing driving characteristics merely involves changing a few parameters in the coarse optimization part of the method, which is easily achieved in practice;

The present methods may typically work independently of pre-defined maneuvers such as pre-computed scenarios (typically cruising, following, braking, and overtaking). They make it possible for the controlled vehicle to have a high degree of autonomy and can deal with scenarios never encountered before.

Computerized systems can be suitably designed for implementing embodiments of the present invention as described herein. In that respect, it can be appreciated that the methods described herein are at least partly non-interactive, i.e., automated. Automated parts of such methods can be implemented in software, hardware, or a combination thereof. In exemplary embodiments, automated parts of the methods described herein are implemented in software, as a service or an executable program (e.g., an application), the latter executed by suitable digital processing devices.

Figure 6:
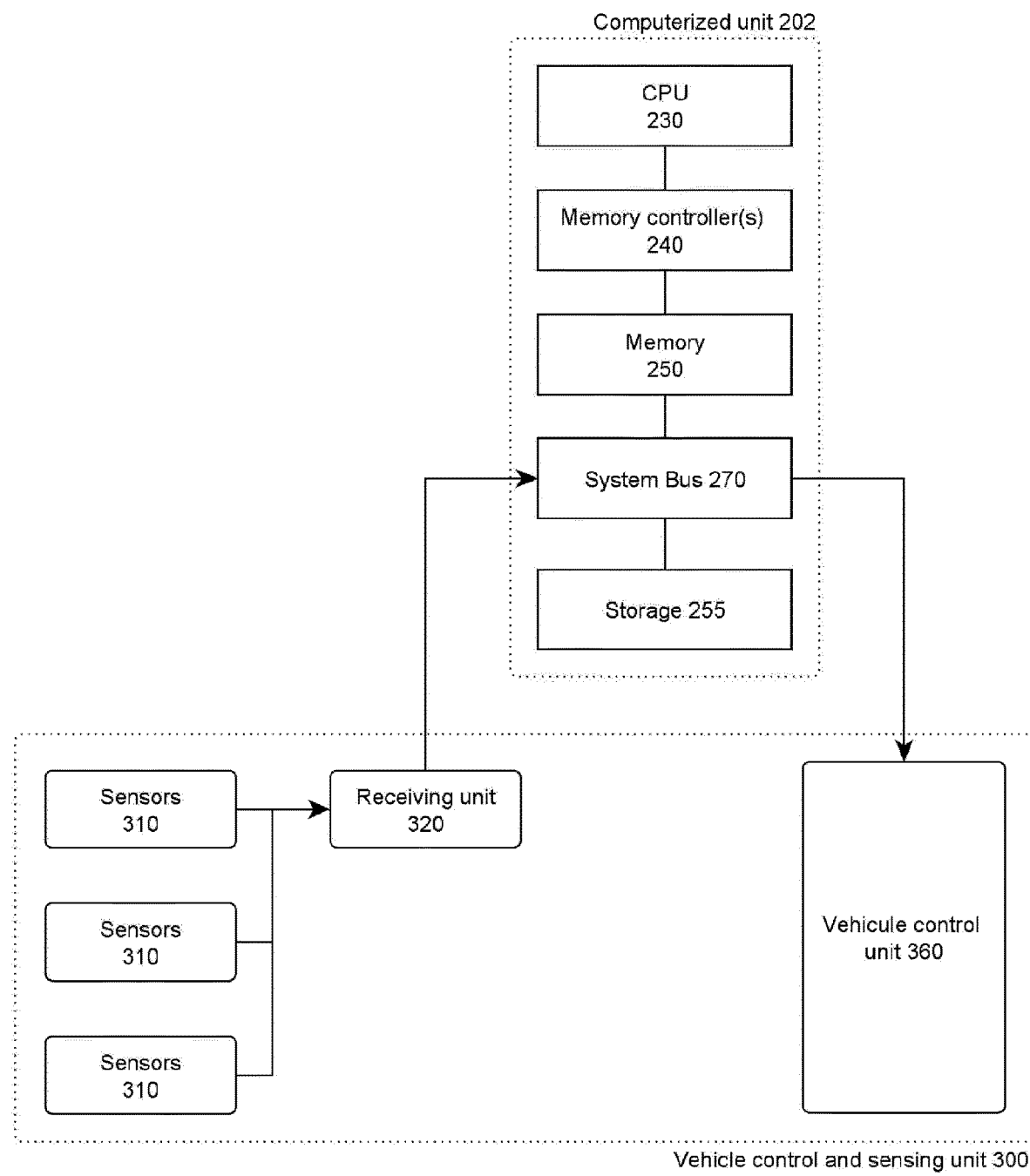
FIG. 6 depicts a computerized system suitable to implement steps of a method according to embodiments of the invention. Such a computerized system may for example be embedded in an autonomous or semi-autonomous vehicle.

In that respect, referring to FIG. 6, another aspect of the invention is now described, which relates to a computerized system designed to control a vehicle. The system includes a computerized unit 202, which has one or more processors 230, as well as a control unit 360, which is connected to the computerized unit 202. The system further comprises a memory 250 storing a vehicle model and a software program for executing a method as described above. The computerized unit 202 is notably configured to obtain information describing a roadway 301 and run the software program. To that aim, the software program is typically loaded in the main memory of the unit 202 and, once loaded, executed by the one or more processors. This way, the vehicle control unit 360 can control the vehicle thanks to signals obtained from trajectories optimized upon execution of the present methods by the processors.

The unit 202 shown in FIG. 3 is a system meant to be embedded in a vehicle 90, whereas the unit 200 is a general- or special-purpose computer, which may be embedded in a vehicle 90 or a computer configured as a simulation system. Despite differences in terms of intended applications, both units 200, 202 are functionally similar, inasmuch as they both include processing means 230, a (main) memory 250, and storage means 255. The storage 255 stores suitable computerized methods, which can be loaded in the main memory 250 to cause the system to take steps as described earlier in reference to the first aspect of the invention, e.g., optimize trajectories and provide control data, so as to eventually obtain control signals for controlling the vehicle 90.

Note, the invention may possibly be embodied as a vehicle 90 including such a computerized unit 200, 202. FIG. 6 is a functional diagram showing components of the vehicle 90, wherein such components interact to implement steps as described earlier in reference to the present methods. In the example of FIG. 6, the vehicle 90 includes several sensors 310, a receiving unit 320, and a computerized unit 202 as described above. At least one of the sensors 310 is configured to detect a quantity impacting a dynamical state (e.g., speed, acceleration, etc.) of the vehicle 90. In addition, some of the sensors 310 may be configured to detect events or changes in the environment of the vehicle 90, including obstacles, e.g., to enable motion planning. The sensors 310 accordingly produce signals, which are transmitted to the receiving unit 320. The latter is suitably connected to the sensors 310, so as to be able to receive such sensor signals, in operation. The computerized unit 202 is connected to the receiving unit 320, so as to receive signals therefrom, in operation.

Note, the signals received by the unit 320 may possibly require further processing, in order to be exploited by the unit 202. Said further processing may possibly be performed at the receiving unit and/or the unit 202. E.g., the unit 202 may need to perform data processing to translate and/or further process the signals it receives, or sort specific signals out of the received signals. In all cases, the receiving unit 320 is connected to the sensors and configured to receive said sensor signals from the sensors 310, so as to eventually produce (or cause to produce) the real-time signals needed for carrying out the present methods. I.e., such real-time signals may then be adequately used for optimization purposes. For completeness, the computerized unit 202 is configured in the vehicle 90 so as to instruct to actuate the latter according to the control signals obtained, via a vehicle control unit 360, which is connected to the computerized unit 202 via the system bus 270.

Next, according to a final aspect, the invention can be embodied as a computer program product for controlling a speed of a vehicle. Basically, the computer program product comprises a computer readable storage medium having program instructions embodied therewith, where the program instructions executable by a plurality of processing means to cause the latter to take steps according to the present methods.

Figure 7:
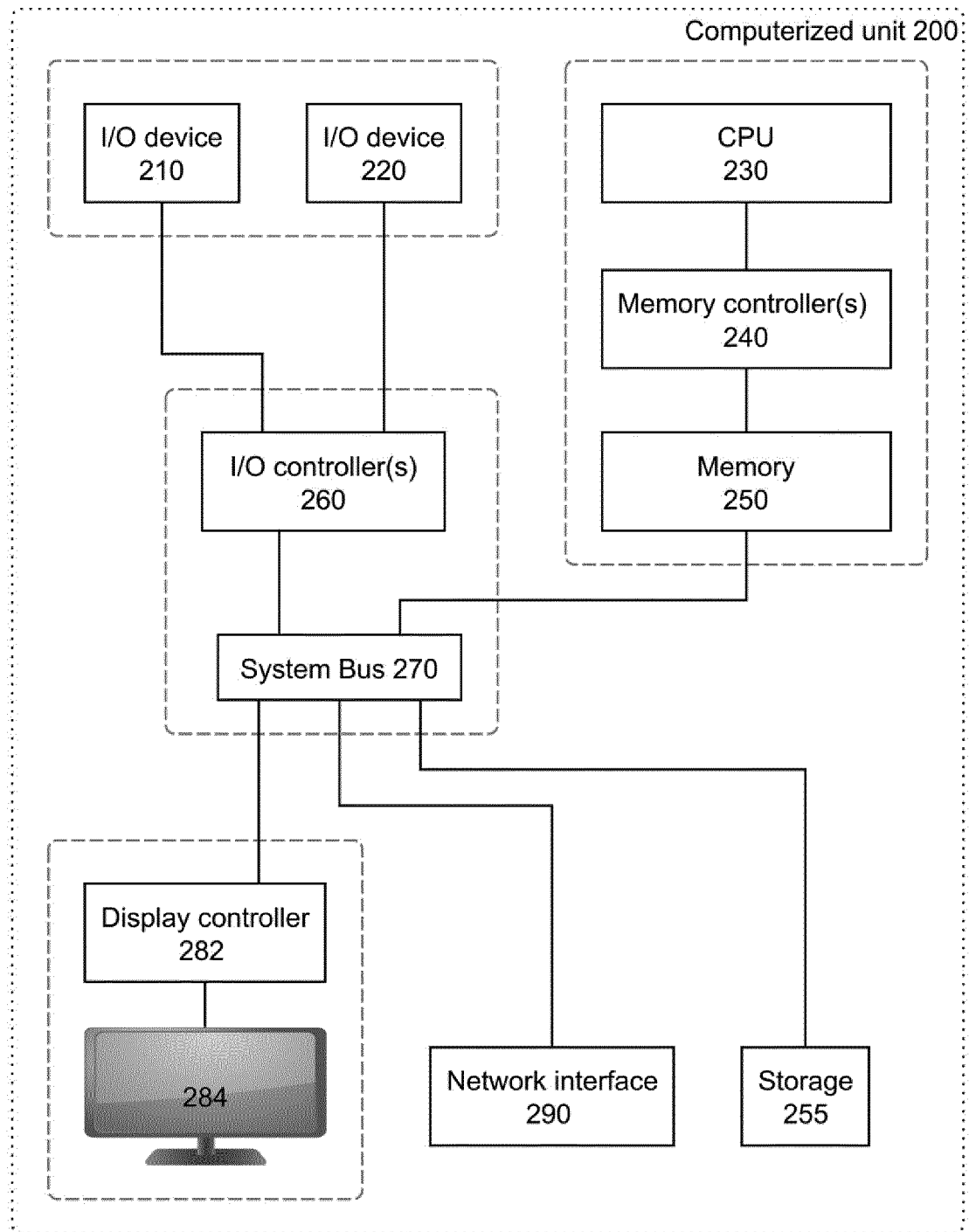
FIG. 7 schematically represents a general-purpose computerized system, suited for implementing method steps as involved in embodiments of the invention.

As depicted in FIG. 7, a typical computerized device (or unit) 200 includes a processor 230 and a memory 250 (possibly including several memory units) coupled to one or several memory controllers 240. The processor 230 is a hardware device for executing software, as, e.g., loaded in a main memory of the device. The processor, which may in fact comprise one or more processing units, can be any custom made or commercially available processor. Again, the unit 202 shown in FIG. 6 is similar to the system 200 in many respects.

The memory typically includes a combination of volatile memory elements (e.g., random access memory) and non-volatile memory elements, e.g., a solid-state device. The software in memory may include one or more separate programs, each of which comprises an ordered listing of executable instructions for implementing logical functions. In the example of FIG. 7, the software in the memory includes methods described herein in accordance with exemplary embodiments and a suitable operating system (OS). The OS essentially controls the execution of other computer (application) programs and provides scheduling, input-output control, file and data management, memory management, and communication control and related services. It may further control the distribution of tasks to be performed by the processing units 230.

The methods described herein shall typically be in the form of executable program, script, or, more generally, any form of executable instructions, although part (or all) of the algorithms described herein are preferably executed according to nonlinear programming instructions.

The computerized unit 200 can further include a display controller 282 coupled to a display 284. In exemplary embodiments, the computerized unit 200 further includes a network interface 290 or transceiver for coupling to a network (not shown). In addition, the computerized unit 200 will typically include one or more input and/or output (I/O) devices 210, 220 (or peripherals) that are communicatively coupled via a local input/output controller 260. A system bus 270 interfaces all components. Further, the local interface may include address, control, and/or data connections to enable appropriate communications among the aforementioned components. The I/O controller 135 may have additional elements, which are omitted for simplicity, such as controllers, buffers (caches), drivers, repeaters, and receivers, to allow data communication.

When the computerized unit 200 is in operation, one or more processing units 230 executes software stored within the memory of the computerized unit 200, to communicate data to and from the memory 250 and/or the storage unit 255 (e.g., a hard drive and/or a solid-state memory), and to generally control operations pursuant to software instruction. The methods described herein and the OS, in whole or in part are read by the processing elements, typically buffered therein, and then executed. When the methods described herein are implemented in software, the methods can be stored on any computer readable medium for use by or in connection with any computer related system or method.

Computer readable program instructions described herein can for instance be downloaded to processing elements from a computer readable storage medium, via a network, for example, the Internet and/or a wireless network. A network adapter card or network interface 290 may receive computer readable program instructions from the network and forwards such instructions for storage in a computer readable storage medium 255 interfaced with the processing means 230.

Aspects of the present invention are described herein notably with reference to the flowchart (block diagram) of FIG. 1. It will be understood that each block, or combinations of blocks, of the flowchart and the block diagram can be implemented by computer readable program instructions.

These computer readable program instructions may be provided to one or more processing elements 230 as described above, to produce a machine, such that the instructions, which execute via the one or more processing elements create means for implementing the functions or acts specified in the block or blocks of the flowchart and the block diagram. These computer readable program instructions may also be stored in a computer readable storage medium.

The block diagram of FIG. 1 illustrates the architecture, functionality, and operation of possible implementations of the computerized unit 200, 202, methods of operating it, and computer program products according to various embodiments of the present invention. Note that each computer-implemented block in the flowchart or the block diagram may represent a module, or a portion of instructions, which comprises executable instructions for implementing the functions or acts specified therein. In variants, the functions or acts mentioned in the blocks may occur out of the order specified in the figures. For example, two blocks shown in succession may actually be executed in parallel, concurrently, or still in a reverse order, depending on the functions involved and the algorithm optimization retained. It is also reminded that each block and combinations thereof can be adequately distributed among special purpose hardware components.

While the present invention has been described with reference to a limited number of embodiments, variants, and the accompanying drawings, it will be understood by those skilled in the art that various changes may be made, and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention is not limited to the particular embodiments disclosed, but that the present invention will include all embodiments falling within the scope of the appended claims. In addition, many other variants than explicitly touched above can be contemplated.

LIST OF REFERENCE SIGNS

| | |
|---|---|
| 1 | Predict vehicle states |
| 2 | Predict future obstacles positions |
| 3 | Grid generation |
| 4 | Generation of corridor in space and time coordinates |
| 5 | Selection of a suitable maximally large corridor |
| 6 | Convexification |
| 7 | Solution of the NLP problem with models blending and lateral and longitudinal vehicle dynamics |
| 8 | Transformation of coordinates |
| 9 | Resampling to higher frequencies |
| 11 | Vehicle state |
| 21 | Obstacles predictions |
| 31 | Grid |
| 41 | Drivable space |
| 51 | Nonconvex corridor |

-continued

LIST OF REFERENCE SIGNS

| | |
|---|---|
| 61 | Mathematically tractable corridor |
| 71 | Motion planning trajectories in curvilinear coordinates |
| 81 | Motion planning trajectories in Euclidean coordinates |
| 90 | Ego vehicle |
| 91 | Obstacle |
| 92 | Motion planning trajectories |
| 101 | Current state information |
| 102 | Driving reference information |
| 103 | Obstacles positions |
| 301 | Road |
| 301' | Transformed road |
| 302 | Right edge |
| 302' | Transformed right edge |
| 303 | Left edge |
| 303' | Transformed left edge |
| 304 | Forward edge |
| 305 | Backward edge |
| 306 | Line segment |
| 307 | Line segment |
| 311 | Grid at point in time $t_0$ |
| 311' | Grid at point in time $t_1$ |
| 311" | Grid at point in time $t_{final}$ |
| 316 | Interrupted grid portion |
| 316' | Interrupted grid portion |
| 316" | No longer interrupted grid portion |
| 317 | Grid portion |
| 317' | Interrupted grid portion |
| 317" | Interrupted grid portion |
| 326' | Lower grid portion |
| 326" | Line segment |
| 327 | Line segment |
| 327" | Lower grid portion |
| 337 | Grid point over time |
| 350 | Convex space-time object |
| 501 | Drivable width |
| 502 | Time |

The invention claimed is:

1. A computer-implemented method for controlling an autonomous or semi- autonomous vehicle, wherein the method comprises:
providing a vehicle model;
obtaining information describing a roadway;
transforming the information obtained in a Frenet-Serret frame, the latter defining a curvilinear coordinate space; and
in the curvilinear coordinate space:
defining a plurality of line segments along the roadway, at locations spaced longitudinally along a reference line defining the Frenet-Serret frame, the line segments having respective lengths that extends, each, perpendicularly to the reference line,
based on the defined line segments, determining a space-time corridor to obtain a time-dependent space available for the vehicle,
obtaining bounds for the vehicle within said time-dependent space, the bounds defining a set of constraints that delimit a plurality of convex space-time objects along the reference line, said objects approximating said time-dependent space, and
based on the obtained set of constraints and the provided vehicle model, providing a motion trajectory of the vehicle through the plurality of convex space-time objects, wherein this motion trajectory is optimized using a nonlinear programming solver; and
transforming the provided motion trajectory from the curvilinear coordinate space to a Euclidean coordinate space, to control the vehicle based on the transformed motion trajectory.

2. The method according to claim 1, wherein
the method further comprises, prior to determining the space-time corridor, determining, based on the defined line segments, a time-dependent drivable space along the roadway, which is feasible, a priori, by the vehicle, and
the space-time corridor is determined according to one or more constraints for the vehicle, such that, at each time point, a spatial part of the space-time corridor is contained in a corresponding spatial part of the time-dependent drivable space.

3. The method according to claim 1, wherein the method further comprises, prior to defining said plurality of line segments,
predicting states relating to the vehicle, wherein the states preferably include a current state of the roadway, a velocity of the vehicle, and a driving reference, whereby the plurality of line segments are defined according to the predicted states.

4. The method according to claim 1, further comprising
predicting an obstacle to obtain obstacle data, whereby the space-time corridor is determined according to both the line segments and the obstacle data.

5. The method according to claim 1, wherein
an algorithm used to optimize the motion trajectory makes use of a cost function that includes a cost proportional to an inverse of a distance between the vehicle and another vehicle or an obstacle, multiplied by a relative velocity with respect to said other vehicle or obstacle.

6. A system for controlling an autonomous or semi-autonomous vehicle, wherein the system comprises
a computerized unit having one or more processors,
a control unit connected to the computerized unit,
a memory storing a vehicle model and a software program for executing a method according to claim 1,
wherein the computerized unit is configured to
obtain information describing a roadway, and
run the software program via the one or more processors, so as for the control unit to accordingly control the vehicle.

7. A computer program product for controlling an autonomous or semi-autonomous vehicle, the computer program product comprising a computer readable storage medium having program instructions embodied therewith, the program instructions executable by processing means, so as to cause the processing means to implement steps of a method according to claim 1.

8. The method according to claim 1, wherein
transforming the motion trajectory results in transformed trajectory outputs, the latter obtained at an output frequency; and
the method further comprises, after having transformed the motion trajectory, resampling said transformed trajectory outputs at a constant, predetermined frequency, which is preferably higher than said output frequency.

9. The method according to claim 8, wherein resampling said transformed trajectory outputs comprises
interpolating said transformed trajectory outputs using the vehicle model to compute trajectory points between trajectory points of the transformed trajectory outputs.

10. The method according to claim 1, wherein
the vehicle model provided is a global vehicle model that comprises two vehicle models, these including a slow velocity model and a high velocity model, whereby the motion trajectory is optimized by blending the two vehicle models.

11. The method according to claim 10, wherein
blending the two vehicle models causes to determine a development of vehicle states; and
said development of vehicle states, noted $dx/dt$, is determined through application of an equation that can be represented as $dx/dt = s(v) \times f_1(x, u) + (1-s(v)) \times f_2(x, u)$, where
$v$ is a vehicle velocity,
$x$ are vehicle states,
$u$ are vehicle inputs,
$f_1$ is a first function and $f_2$ is a second function of two functions describing the slow velocity vehicle model and the high velocity vehicle model, respectively, and
$s(v)$ is a modified sigmoid activation function, designed such that $s(v)=1$ for $v \leq v_1$ and $s(v)=0$ for $v \geq v_2$, where $v_1$ is a lower threshold velocity, $v_2$ is an upper threshold velocity, and $0 < v_1 < V_2$.

12. The method according to claim 11, wherein
at a velocity $v > v_2$, the model used is the high velocity model, the latter being a nonlinear bicycle vehicle model combined with Pacejka tire models, and
at a velocity $v \leq v_1$, the model used is the slow velocity model.

13. The method according to claim 11, wherein
the modified sigmoid activation function can be represented as $s(v)=1/(1+e^v))$ for $v > v_1$ and $v < v_2$, with a continuous transition at $s(v_1)$ and $s(v_2)$.

14. The method according to claim 11, wherein
the modified sigmoid activation function can be represented as $s(v)=0.5+0.5 \sin(\min(0.5 \pi, \max(-0.5 \pi, v-v_{blend})))$, where $v_{blend}=(v_1+v_2)/2$, with a continuous transition at $s(v_1)$ and $s(v_2)$.

15. The method according to claim 11, wherein
the vehicle model provided comprises three vehicle models, these including, in addition to said two vehicle models, a very high velocity vehicle model described by a function $f_3$, whereby said development $dx/dt$ of vehicle states is determined through application of an equation that can be represented as $dx/dt = s_2(v) \times (s(v) \times f_1(x, u) + (1-s(v)) \times f_2(x, u)) + (1-s_2(v)) \times f_3(x, u)$, where $s_2(v)$ is a modified sigmoid function that is designed such that $s_2(v)=1$ for $v \leq v_2$ and $s(v)=0$ for $v \geq v_3$.

* * * * *